Patented July 4, 1939

2,165,189

UNITED STATES PATENT OFFICE 2,165,189

MANUFACTURE OF NORMAL FERRIC SULPHATE

William S. Wilson, Brookline, and John F. White, Somerville, Mass., assignors, by mesne assignments, to Monsanto Chemical Company, a corporation of Delaware No Drawing. Application May 16, 1934, Serial No. 725,902

15 Claims. (Cl. 23—126)

This invention relates to the preparation of normal ferric sulphate and it has particular relation to the preparation of such sulphates by the reaction of ferric oxide with sulphuric acid.

The main objects of the invention are:

To eliminate the formation of acid sulphate in the preparation of normal ferric sulphate;

To eliminate substantially loss of sulphuric acid and resultant contamination of the atmosphere in the manufacture of normal ferric sulphate;

To reduce the amount of water which must be removed from normal ferric sulphate solutions prepared by reaction of ferric oxide and sulphuric acid to a minimum;

To provide a process of preparing normal ferric sulphate in which the reaction between the ferric oxide and the sulphuric acid proceeds rapidly and smoothly to completion.

Ferric sulphate has heretofore been suggested for numerous uses, among which may be included that as a precipitating agent in the clarification of water and sewage. The development of these uses has been difficult because of the fact that a large number of ferric sulphate salts of relatively widely different compositions and characteristics are possible. The following constitutes a partial list of such sulphates:

$Fe_2O_3 4SO_3 9H_2O$
$Fe_2O_3 4SO_3 3H_2O$
$Fe_2O_3 3SO_3$
$Fe_2O_3 3SO_3 . 6H_2O$
$Fe_2O_3 3SO_3 7H_2O$
$Fe_2O_3 2SO_3 H_2O$
$Fe_2O_3 2SO_3 5H_2O$
$2Fe_2O_3 5SO_3 17H_2O$

Those sulphates containing a higher ratio of $SO_3$ to $Fe_2O_3$ than that of the normal sulphate expressed by the formula $Fe_2O_3.3SO_3$, and known as acid sulphates, were not entirely satisfactory because of the excessive amount of acid present which reduced the total amount of active iron present and increased the total amount of ineffective sulphate radical. Those compounds containing a lower ratio of $Fe_2O_3$ to $SO_3$ than that expressed in the formula and known as basic sulphates were totally unsuitable for most purposes because they were highly insoluble. The most satisfactory of these materials for most purposes was the neutral or normal sulphate. However, it was difficult to obtain it sufficiently free from the acid or basic materials.

A method heretofore proposed for the preparation of ferric sulphate comprised the reaction of ferric oxide with sulphuric acid followed by the evaporation of the excess of water present or formed during the course of the reaction. For this reaction sulphuric acid of relatively high concentration, for example that known as oil of vitriol (approximately 60° Bé. to 66° Bé.) was employed. In this way, rapid reaction between the acid and the ferric oxide was obtained. However, it was difficult so to control the course of the reaction as to obtain the desired soluble normal ferric sulphates and to exclude the formation of an excessive amount of the acid sulphate. Under the usual conditions of operation it was found to be impossible to obtain anything except the acid sulphate of the formula $Fe_2O_3 4SO_3$.

Such sulphate, of course, contains an excessive amount of free acid and in order to reduce this amount of acid it was proposed to subject the sulphate to calcination, for example in a rotary furnace, in order to liberate the extra $SO_3$ group which was present in the product. This, of course, resulted in a loss of valuable sulphuric acid and at the same time the fumes released into the atmosphere were destructive and constituted a disagreeable nuisance.

In our copending application for Anhydrous ferric sulphate and method of preparing the same, filed of even date herewith, and bearing Serial No. 725,901 of May 16, 1934 which issued as United States Patent No. 2,149,327, is disclosed a desirable procedure for preparing normal anhydrous ferric sulphate. According to this process, ferric oxide is caused to react with sulphuric acid of moderate concentration (for example about 38° Bé.) until at least 27% of the acid present has been combined. As long as the above concentration of acid is maintained, no acid sulphates are precipitated. After 27% of the acid has combined, the equilibrium is found to be such that acid salts do not precipitate, regardless of the concentration of the acid. The solutions may then be evaporated to a high state of concentration without harm.

The present invention involves broadly an application of the principle disclosed in the above-indicated application, that after 27% or more of the total sulphuric acid has been combined the normal ferric sulphates rather than the acid sulphates constitute the solid phase in equilibrium with the concentrated solution and acid salts do not precipitate. In the present invention this principle is applied by initially introducing a portion (approximately 27% to 75%) of the ferric oxide into the acid and heating until at least 27% of the acid has entered into combination with the oxide and then so regulating the conditions as to obtain all of the acid salts in solution and finally adding the remainder of the ferric oxide in a separate stage or step.

The mixture may then be heated to drive off excess water. The final product consists essentially of normal ferric sulphate which is highly water soluble. There is present only a relatively small residue of insoluble silica which was present as an impurity in the original ferric oxide, together with a little unreacted ferric oxide. The desired normal ferric sulphate product may be obtained by a plurality of different procedures, all of which embody the broad concept of the invention.

One convenient method involves the addition of a portion (approximately one-third to three-fourths) of the ferric oxide, for example pyrite cinder, to the full amount of sulphuric acid. The strength of this acid should be approximately 38° Bé. and should not exceed approximately 40° Bé. during the initial stages of the reaction. Acid of a concentration much lower than approximately 35° Bé. or 36° Bé. is not satisfactory because the reaction is excessively slow for commercial purposes. The mass is stirred at the boiling temperature and during this stage of the reaction care should be observed to prevent the concentration of the acid from rising due to evaporation of water. Such concentration, if it causes the ratio of total $SO_3$ to water to exceed that represented by an approximately 40° Bé. sulphuric acid, results in the production of crystalline acid sulphates which are undesirable and which at the same time carry down more of the water present in the reaction as water of crystallization. This removal of water through crystallization and through evaporation, if unchecked, may result in the increase of the concentration of the acid to such an extent as to cause so much of the ferric iron to precipitate as crystalline acid sulphates as to cause the entire batch to freeze up or solidify. However, such undesired results can be prevented by the addition of a small amount of water whenever separation of acid sulphates takes place.

The reaction between the first portion of ferric oxide and the sulphuric acid is permitted to go to completion or at least to proceed sufficiently far to insure that at least 27% of the acid has been combined. After this stage has been reached, it is found that acid salts will no longer separate but instead the neutral or normal ferric sulphate which is desired, constitutes the material which will separate upon concentration of the solution. It is now admissible to add the final portion of ferric oxide and then heat the solution until the reaction is complete and no acid sulphate will separate. It is desirable to concentrate the solution so far as is practicable before the addition of this final portion of the ferric oxide. This may be accomplished in any desired manner, for example, by evaporation either at atmospheric pressures or under reduced pressures. The degree to which this initial concentration may be carried is a variable, depending upon the amount of ferric oxide initially introduced into the sulphuric acid. However, if sufficient oxide is introduced to react with at least 65% of the sulphuric acid in the initial stage, it is possible to concentrate the solution down to a degree in which it will have an analysis of 18% of $Fe_2O_3$ and 40% of $SO_3$ before the addition of the last portion of the ferrec oxide. With these concentrated solutions there, of course, will remain but little, if any, water to be evaporated from the final material in order to obtain a solid product. Indeed, the product after addition of the last portion of the ferric oxide may be sufficiently dry to admit of calcination in a suitable revolving drum to drive off water of crystallization without preliminary drying. It is also to be understood that calcination of the product may be effected by the application of heat directly to the vessel in which the final addition of ferric oxide occurs. This calcination may occur at any convenient temperature. However, approximately 450° C. has been found satisfactory. The time should be sufficient to effect adequate removal of water. This step of calcination has been discussed more in detail in connection with the afore-designated application for anhydrous ferric sulfate and method of preparing the same. In this way, a substantially anhydrous material is obtained which may have the composition:

94.2% $Fe_2(SO_4)_3$
1.5% $FeSO_4$
4.4% Insoluble

As previously explained, the insoluble matter consists essentially of silica and ferric oxide. These materials are not objectionable in many applications of the product and but little waste is involved in connection therewith. The material is practically acid-free before calcination, and as a result free sulphuric acid liberated into the atmosphere does not constitute a problem.

It will, of course, be appreciated that under some conditions it may not be necessary to subject the material to this final step of calcination. Instead, the water of crystallization may be retained in the product.

The several steps of the above process and certain modifications thereof may be summarized step-wise as follows:

EXAMPLE 1

*Preliminary dissolution.*—All of the sulphuric acid required for a batch is reacted with approximately half of the required cinder. The acid employed is preferably of approximately 38° Bé. concentration and the mixture is reacted while stirring at approximately the boiling temperature.

*Concentration.*—The resulting solution, which contains some silicious insoluble matter, is concentrated to the saturation point or even beyond the saturation point.

*Final dissolution.*—The concentrated solution is fed continuously into a mixer where it is intermixed with the remaining amount of cinder in order to neutralize the free acid. This operation is advantageously effected at an elevated temperature in order that the reaction may go to completion readily.

*Calcination.*—The resulting mixture is passed through a kiln, if necessary, where any unreacted ferric oxide and sulphuric acid combine and any excess sulphuric acid is eliminated.

EXAMPLE 2

Various modifications in the process as above discussed may be employed. For example, it is possible to introduce continuously a mixture of sulphuric acid, water and ferric oxide into a suitable dissolver, which should contain at least 27% of the total $SO_3$ contained therein as combined sulphate. The resultant product is then permitted to overflow into a final mixer where the last portion of ferric oxide is added. The product may be freed of water by the application of heat in this final mixture or by feeding it into a suitable kiln for calcination. The process as thus described may be summarized as follows:

*Preliminary dissolution.*—Sulphuric acid, water and cinder are added continuously to a dissolver containing a solution in which more than 27% of the SO₃ is combined with ferric oxide. The composition of the solution which is discharged continuously contains more than 27% of the SO₃ combined with ferric oxide (preferably the amount of combined SO₃ is over 50%). Excessive amounts of undissolved cinder should be avoided by controlling the rate of addition of the cinder and acid to the dissolver. The acid added at this point may be 66° Bé. or less and the amount of ferric oxide added in the form of cinder is about half of that called for by the acid.

*Final dissolution.*—The overflow from the dissolver is fed continuously into a mixer where it is caused to react with an amount of cinder required to neutralize the free acid. This cinder may advantageously be added continuously and a temperature sufficiently high to assure a rapid rate of dissolution is maintained.

*Calcination.*—If the mixture obtained in the final dissolution stage is maintained sufficiently hot, the reaction will be substantially complete, otherwise the discharge is caused to pass through a kiln where the unreacted ferric oxide and sulphuric acid are combined.

It will be appreciated that in this process the essential feature involves so regulating the continuous feed of water, acid and ferric oxide as to insure the presence of at least 27% of the total SO₃ in the dissolver will be in combined form.

EXAMPLE 3

According to the provisions of a third procedure, the use of relatively low concentration acid is obviated. In this case a portion of the ferric oxide in the form of pyrite cinder is admixed directly with the concentrated sulphuric acid to form an acid sulphate. This admixture may be effected within a cement type mixing machine and the feed may be continuous, preferably approximately 50% to 70% of the cinder is added at this time. Acid sulphates are thus produced which are dissolved by the addition of a sufficient amount of water in a continuous dissolver to form a saturated solution which is run into a second mixer where the remainder of the ferric oxide is added. The final product may be calcined in a suitable kiln as already described in connection with the other methods of procedure. The flow of the materials according to this procedure may be summarized as follows:

*Preliminary reaction.*—A strong sulphuric acid of 60° to 66° Bé. concentration is mixed with approximately half of the equivalent quantity of iron oxide cinder required to produce the normal sulphate, whereby the acid ferric sulphate is obtained.

*Dissolution.*—The resulting acid sulphate is mixed with sufficient water, thereby producing a saturated solution approximately at the boiling temperature. This dissolving operation may be effected advantageously in a continous manner. The resulting solution, which discharges continuously and which should not contain an appreciable amount of undissolved acid sulphate, is caused to react with additional cinder.

*Dissolution.*—The solution of the acid sulphate and cinder is caused to react preferably at an elevated temperature with the remaining required amount of cinder whereby normal sulphate solution is produced. The solution is then converted to the solid product as in the preceding embodiment.

It may also be possible to inhibit the precipitation of acid sulphates in concentrated acid solutions by admixing the acid directly with preformed soluble sulphate salts in an amount sufficient to bring the proportion of combined acid above the minimum allowable value prior to or simultaneously with the addition of the cinder. All of the cinder may then be added at one time.

All of the methods as thus described are characterized by the fact that the final portion of the ferric oxide is added to a solution containing enough combined acid dissolved therein to inhibit separation of acid salts at any concentration.

By thus employing the principles of the present invention, a product is obtained which is substantially free from sulphates in acid form and as a result the loss of sulphuric acid is eliminated. Also, the process admits of the employment of relatively concentrated acids and the evaporation of water required to obtain a dry product is thus greatly reduced.

Although we have described only the preferred embodiments of the invention, it is to be understood that these are merely representative and illustrative and that various modifications may be made therein without departure from the spirit of the invention or from the scope of the appended claims.

What we claim is:

1. The process of making water soluble, normal anhydrous ferric sulphate which comprises adding ferric oxide to sulphuric acid of 35°–40° Bé. in two stages, at least 27% of the acid being caused to react with the ferric oxide in the initial stage before the addition of the final portion of the oxide, the amount of ferric oxide in the final addition being approximately equivalent to the free sulphuric acid then present, and calcining the resultant ferric sulphate to anhydrous state the concentration of the acid being adjusted after at least 27% of the total sulphuric acid has been combined as ferric sulphate and before the final addition of ferric oxide to obtain all of the ferric sulphate in solution.

2. A method of making normal ferric sulphate which comprises reacting ferric oxide with sulphuric acid of not substantially less than 35° Bé. in two stages, at least 27% of the ferric oxide and not more than approximately 75% being caused to react in the initial stage, and then adding the remainder of the ferric oxide in the final stage and fixing the amount of water in the solution at the time of addition of the final portion of ferric oxide so that it is sufficient to inhibit the presence of any substantial amount of acid ferric sulphate in crystalline form at the time of the final addition, the amount of ferric oxide in the final addition being approximately equivalent to the free sulphuric acid then present, and calcining the resultant ferric sulphate to anhydrous state.

3. A method of making water soluble, normal ferric sulphate which comprises reacting an initial portion of ferric oxide with sulphuric acid of approximately 38° Bé. to effect combination with at least 27% of the acid while not permitting the concentration of the SO₃ to exceed that present in approximately 40° Bé. acid, then concentrating the solution approximately to the point of saturation and adding the remainder of the ferric oxide, the amount of ferric oxide in the final addition being approximately equivalent to the free sulphuric acid then present, and calcining the resultant ferric sulphate to anhydrous state without otherwise subjecting it to decomposition, the initial portion of ferric oxide being not more than 75% of the total used.

4. A method of making water soluble, normal ferric sulphate which comprises reacting ferric oxide in two portions with sulphuric acid of not less than 35° Bé., the initial portion being sufficient to react with at least 27% of the total sulphuric acid, then adding the final portion of ferric oxide, and regulating the amount of water in the acid so that substantially all of the ferric sulphate is in solution at the time of the final addition of ferric oxide, the amount of ferric oxide in the final addition being approximately equivalent to the free sulphuric acid then present, drying and calcining the resultant ferric sulphate to anhydrous state without otherwise decomposing it.

5. The method of making normal ferric sulphate which comprises reacting sulphuric acid in concentrated form with ferric oxide until at least 27% of the total sulphate is present in combined form as normal sulphate, diluting the sulphate until all of the precipitated acid sulphate which is formed is brought into solution, then adding sufficient ferric oxide to react with the remainder of the free acid.

6. The method as defined in claim 5 in which the product obtained is subjected to calcination to remove water of hydration without otherwise decomposing it.

7. A method of making normal ferric sulphate which comprises mixing strong sulphuric acid with ferric oxide in an amount sufficient to react with approximately 50% of the total acid, effecting reaction between the acid and the ferric oxide, adding water to dissolve the precipitated acid sulphates, adding the remainder of the ferric oxide required to combine with the remainder of the free acid effecting reaction between it and the acid, and calcining the product to eliminate water crystallization without otherwise decomposing it.

8. A method as defined in claim 3 in which the product is subjected to calcination to drive off water of hydration.

9. A method of making dry normal ferric sulphate which is substantially free from acid sulphates and water insoluble reaction products, which method is characterized in that ferric oxide and sulphuric acid of at least 35° Bé. are caused to react, said ferric oxide being present in a quantity sufficient to react with at least 27% and not more than 75% of the acid, thereafter adding water sufficient to effect dissolution of any solid reaction product which separates out, and thereafter adding sufficient ferric oxide to react with the remainder of the free acid and continuing the reaction whereby the iron oxide and sulphuric acid are substantially completely consumed and such amount of water is removed by volatilization as is necessary to give a dry product.

10. A process as defined in claim 9 in which the dry product obtained is subjected to calcination at a temperature sufficient to drive off water of hydration without otherwise decomposing it.

11. A method of transforming ferric oxide into a solution of ferric sulphate which comprises treating the ferric oxide with sulphuric acid of approximately 35° to 40° Bé. until at least 27% of the acid has reacted while not permitting the concentration of the $SO_3$ to exceed that present in approximately 40° Bé. acid, then evaporating off water to form a concentrated solution, and reacting the rest of the acid with the ferric oxide.

12. The method of preparing normal ferric sulphate by the reaction of sulphuric acid and ferric oxide which comprises adding sulphuric acid, ferric oxide and water to an aqueous solution of ferric sulphate and sulphuric acid free from precipitated acid ferric sulphate and in which at least 27% of the total $SO_3$ is combined as ferric sulphate and in which the ratio of water to total $SO_3$ is not substantially greater than the ratio of water to $SO_3$ in a 35° Bé. sulphuric acid, then adding sufficient ferric oxide to this solution to react with the unreacted sulphuric acid therein.

13. In the method of preparing normal ferric sulphate by the reaction of aqueous sulphuric acid and ferric oxide the improvement comprising preparing an aqueous solution of ferric sulphate and sulphuric acid free from precipitated acid ferric sulphate and in which at least 27% of the total $SO_3$ is combined as ferric sulphate and in which the ratio of water to total $SO_3$ is not substantially greater than the ratio of $H_2O$ to $SO_3$ in 35° Bé. sulphuric acid, then adding sufficient ferric oxide to this solution to react with the unreacted sulphuric acid therein.

14. The method as defined in claim 13 in which the product is subjected to calcination at a temperature sufficient to remove water of hydration without substantially decomposing the normal ferric sulphate.

15. In the method of preparing normal ferric sulphate, by the reaction of ferric oxide and aqueous sulphuric acid, the step which comprises forming an aqueous solution of ferric sulphate and sulphuric acid free from precipitated ferric sulphate, said sulphate containing at least 27% of the total $SO_3$ present in the solution, said solution being further characterized in that the ratio of water to total $SO_3$ therein is not substantially greater than the ratio of water to $SO_3$ in a 35° Bé. sulphuric acid.

WILLIAM S. WILSON.
JOHN F. WHITE.